US011337121B2

(12) United States Patent
Padden et al.

(10) Patent No.: US 11,337,121 B2
(45) Date of Patent: May 17, 2022

(54) METHODS AND SYSTEMS FOR COMMUNICATING BETWEEN BASE STATIONS OF TWO DIFFERENT WIRELESS COMMUNICATION NETWORKS

(71) Applicant: CABLE TELEVISION LABORATORIES, INC., Louisville, CO (US)

(72) Inventors: Joseph Padden, Boulder, CO (US); Jennifer Andreoli-Fang, Boulder, CO (US)

(73) Assignee: Cable Television Laboratories, Inc., Lousiville, CO (US)

(*) Notice: Subject to any disclaimer, the term of this patent is extended or adjusted under 35 U.S.C. 154(b) by 64 days.

(21) Appl. No.: 16/813,004

(22) Filed: Mar. 9, 2020

(65) Prior Publication Data

US 2020/0213915 A1 Jul. 2, 2020

Related U.S. Application Data

(62) Division of application No. 16/353,904, filed on Mar. 14, 2019, now Pat. No. 10,588,057.

(60) Provisional application No. 62/645,956, filed on Mar. 14, 2018.

(51) Int. Cl.
*H04W 36/00* (2009.01)
*H04W 36/08* (2009.01)
*H04W 16/14* (2009.01)
*H04W 92/20* (2009.01)

(52) U.S. Cl.
CPC ....... *H04W 36/0044* (2013.01); *H04W 16/14* (2013.01); *H04W 36/08* (2013.01); *H04W 92/20* (2013.01)

(58) Field of Classification Search
CPC ..... H04W 16/14; H04W 16/28; H04W 24/10; H04W 48/16; H04W 72/082; H04W 92/20; H04W 36/08; H04W 36/0044
See application file for complete search history.

(56) References Cited

U.S. PATENT DOCUMENTS

| 2011/0211559 A1* | 9/2011 | Lim | H04W 36/02 370/331 |
| 2016/0037426 A1* | 2/2016 | Li | H04W 36/04 370/332 |
| 2017/0311170 A1* | 10/2017 | Jang | H04W 16/14 |

(Continued)

*Primary Examiner* — Dai Phuong
(74) *Attorney, Agent, or Firm* — PdZ Patent Law, PLLC

(57) ABSTRACT

A method for communicating between base stations of two different wireless communication networks may include (1) transmitting a setup request message from a first base station of a first wireless communication network to a second base station of a second wireless communication network, the setup request message including a first user equipment (UE) device context format of the first wireless communication network and a second UE device context format of the second wireless communication network; (2) receiving, at the first base station, a setup response from the second base station, the setup response including a union of the first UE device context format and the second UE device context format; and (3) at the first base station, communicating with the second base station according to the union of the first UE device context format and the second UE device context format.

15 Claims, 14 Drawing Sheets

(56) References Cited

U.S. PATENT DOCUMENTS

| | | | | |
|---|---|---|---|---|
| 2019/0058997 A1* | 2/2019 | Futaki | ................ | H04W 16/02 |
| 2019/0274075 A1* | 9/2019 | Chai | ................ | H04W 36/0005 |
| 2019/0274076 A1* | 9/2019 | Kim | ................ | H04W 36/00 |
| 2020/0092764 A1* | 3/2020 | Huang | ................ | H04W 36/0066 |
| 2020/0196379 A1* | 6/2020 | Park | ................ | H04W 60/00 |
| 2021/0014715 A1* | 1/2021 | Jung | ................ | H04W 74/0833 |
| 2021/0410151 A1* | 12/2021 | Chen | ................ | H04W 74/006 |

* cited by examiner

METHODS AND SYSTEMS FOR COMMUNICATING BETWEEN BASE STATIONS OF TWO DIFFERENT WIRELESS COMMUNICATION NETWORKS

RELATED APPLICATIONS

This application is a divisional application of U.S. patent application Ser. No. 16/353,904, filed on Mar. 14, 2019, which claims benefit of priority of U.S. Provisional Patent Application Ser. No. 62/642,956, filed on Mar. 14, 2018. Each of the aforementioned patent applications is incorporated herein by reference.

BACKGROUND

User Equipment (UE) devices, such as mobile telephones and tablet computers, may move or "roam" from one wireless communication network to another, such as when moving from one geographic area to another geographic area, or due to changes in wireless communication service. For example, a UE device moving from a first geographic area to a second geographic area may roam from a first wireless communication network covering the first geographic area to a second wireless communication network covering the second geographic area. As another example, a UE device may roam from a first wireless communication network to a second wireless communication network covering the same geographic area in response to degraded service from the first wireless communication network. This ability of a UE device to roam among wireless communication networks helps ensure that the UE device has quality service available as the UE device moves to different geographic areas and as wireless communication service changes in quality.

In addition, new technologies are expected to increase the number of wireless communication networks available in many areas. For example, multiple wireless communication service providers may establish respective wireless communication networks in a common area using shared radio frequency (RF) spectrum, e.g., in citizens broadband radio service (CBRS) spectrum or in unlicensed spectrum, operating according to aspects of a long-term evolution (LTE) protocol or a fifth generation (5G) New Radio-Unlicensed (NR-U) protocol. As another example, site operators may establish neutral host networks, e.g. LTE networks or 5G NR-U networks, that are open to subscribers of multiple wireless communication service providers, to improve wireless communication at their respective sites. Such increase in wireless communication networks may increase opportunities for UE devices to roam among wireless communication networks.

DETAILED DESCRIPTION OF THE EMBODIMENTS

Disclosed herein are methods and systems for communicating between base stations of two or more different wireless communication networks. In some embodiments, the different wireless communication networks share common RF spectrum, e.g. CBRS spectrum or unlicensed spectrum. In particular embodiments, respective base stations of different wireless communication networks are capable of establishing communication interfaces between each other, such that the base stations of the different wireless communication networks can communicate with each other. The base stations of the different wireless communication networks communicate with each other, for example, to coordinate handover of a UE device from one base station to another, to coordinate sharing of common RF spectrum, and/or to help prevent interference between base stations. In some embodiments, the base stations coordinate sharing of common RF spectrum, e.g., at least partially according to base station load and/or market conditions.

Figure 1:
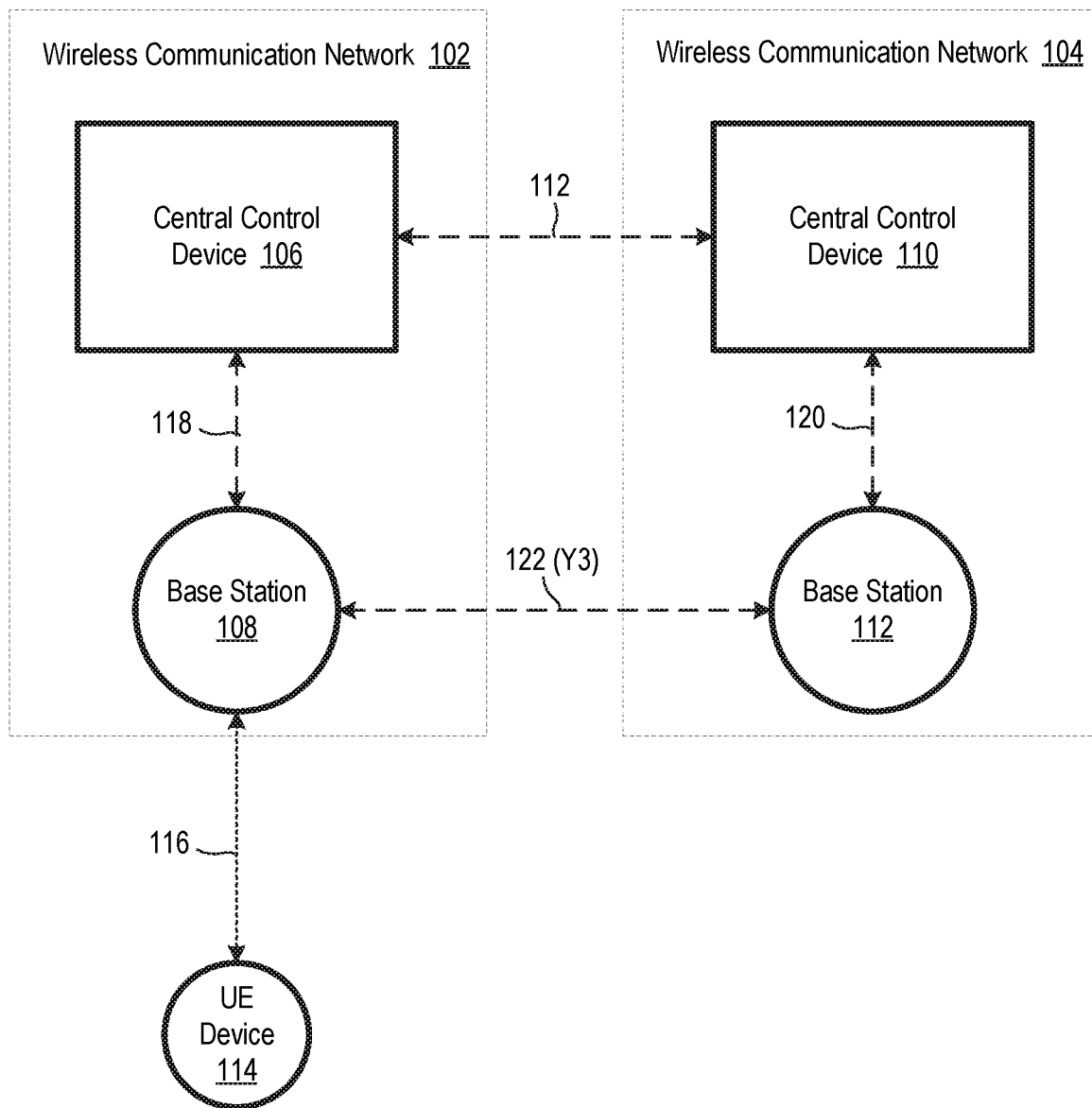
FIG. 1 is a schematic diagram illustrating two wireless communication networks configured to support communication between respective base stations of the two wireless communication networks, according to an embodiment.

FIG. 1 is a schematic diagram illustrating two wireless communication networks 102 and 104 that are configured to support communication between respective base stations of the two wireless communication networks. Wireless communication network 102 includes a central control device 106 and a base station 108, and wireless communication network 104 includes a central control device 110 and a base station 112. Each of central control device 106 and central control device 110 controls operation of at least some aspects of its respective wireless communication network 102 and 104. In some embodiments, each of central control device 106 and central control device 110 includes a packet core network, e.g. an evolved packet core (EPC), an extension of an EPC, a 5G Core, a Wireless-Wireline Converged Core, a Wi-Fi Core, or a variation of an EPC. Although central control devices 106 and 110 are each depicted as a single device in FIG. 1, central control devices 106 and 110 may include a plurality of elements, which may be located together or may be distributed among two or more locations. Central control device 106 and central control device 110 need not necessarily have the same configuration, for example, based on one of the eight split options described by the ITU-T and 3GPP.

Each of base station 108 and base station 112 provides wireless access to its respective wireless communication network 102 and 104 for one or more UE devices. For example, FIG. 1 illustrates a UE device 114 being connected to base station 108 via RF signals 116. In some embodiments, RF signals 116 are within unlicensed RF spectrum, e.g., CBRS spectrum or Wi-Fi spectrum, and wireless communication networks 102 and 104 share the spectrum. In some other embodiments, wireless communication networks 102 and 104 operate with different respective RF spectrum. Examples of each of base station 108 and 112 include, but are not limited to, a LTE base station (e.g., an eNB device), a NR base station (e.g., a gNB device), a sixth Generation (6G) wireless communication base station, a Wi-Fi base station (e.g., including unscheduled, partially scheduled, and unscheduled systems), and variations and/or extensions thereof. Examples of UE device 114 include, but are not limited to, a computer, a set-top device, a data storage device, an Internet of Things (IoT) device, an entertainment device, a wireless access point (including, for example, eNBs, gNBs, and Wi-Fi APS acting as UEs), a computer networking device, a mobile telephone, a smartwatch, a wearable device with wireless capability, and a medical device. In some embodiments, each of base station 108, base station 112, and UE device 114 operate according to a LTE protocol, a 4G protocol, a NR protocol, e.g., a 5G protocol, a New Radio-Unlicensed (NR-U) protocol, or a 6G protocol.

Each of wireless communication network 102 and wireless communication network 104 may include additional base stations (not shown), such as to provide wireless service over a significant geographic area or to cover more than one wireless communication protocol. Additionally, although only one UE device 114 is illustrated in FIG. 1 for simplicity, it is anticipated (but not required) that each of wireless communication network 102 and wireless communication network 104 will serve multiple UE devices at a given time.

Base station 108 is communicatively coupled to central control device 106 via a communication interface 118, and base station 112 is communicatively coupled to central control device 110 via a communication interface 120. Each of communication interface 118 and communication interface 120 includes, for example, one or more of an optical cable, an electrical cable, and a wireless communication link. In some embodiments, each of communication link 118 and communication link 120 is an evolved packet system interface, e.g. a superset of a S1-U interface and S1-MME interface.

Central control device 106 and central control device 110 are communicatively coupled via a communication link 112. In some embodiments, communication link 112 includes a dedicated communication link between wireless communication network 102 and wireless communication network 104. In some embodiments, communication link 112 includes a non-dedicated communication link, e.g., the public Internet. Communication link 112 could include multiple communication circuits, e.g., a dedicated optical cable operating in conjunction with the public Internet or via one or more access networks directly or indirectly connected, etc. Although wireless communication networks 102 and 104 are depicted as having a common architecture, the architectures of wireless communication networks 102 and 104 need not be the same. For example, in some embodiments, wireless communication networks 102 and 104 are owned by different respective wireless communication service providers and have different respective architectures.

Figure 2:
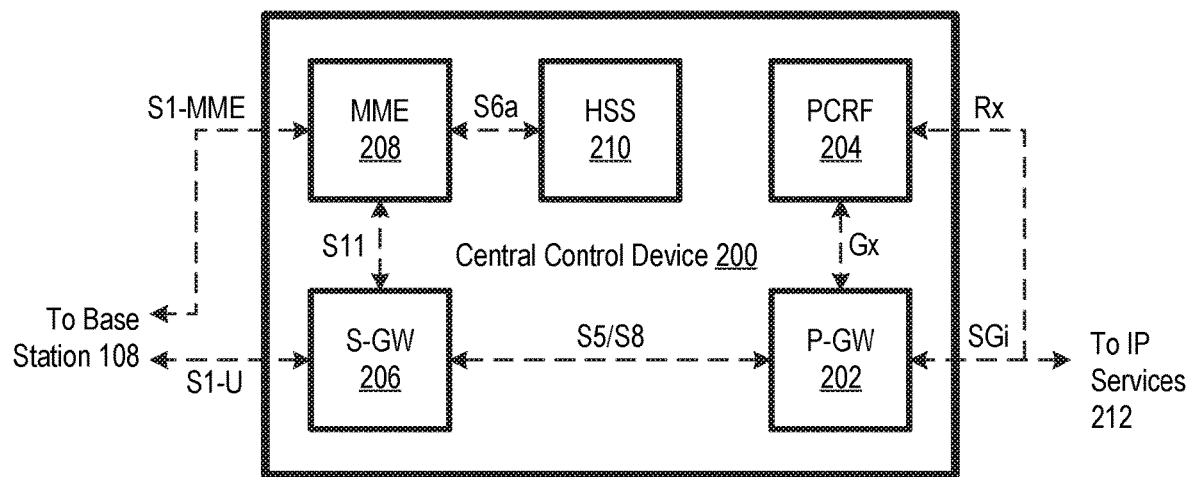
FIG. 2 is a schematic diagram of a central control device, according to an embodiment.
Figure 3:
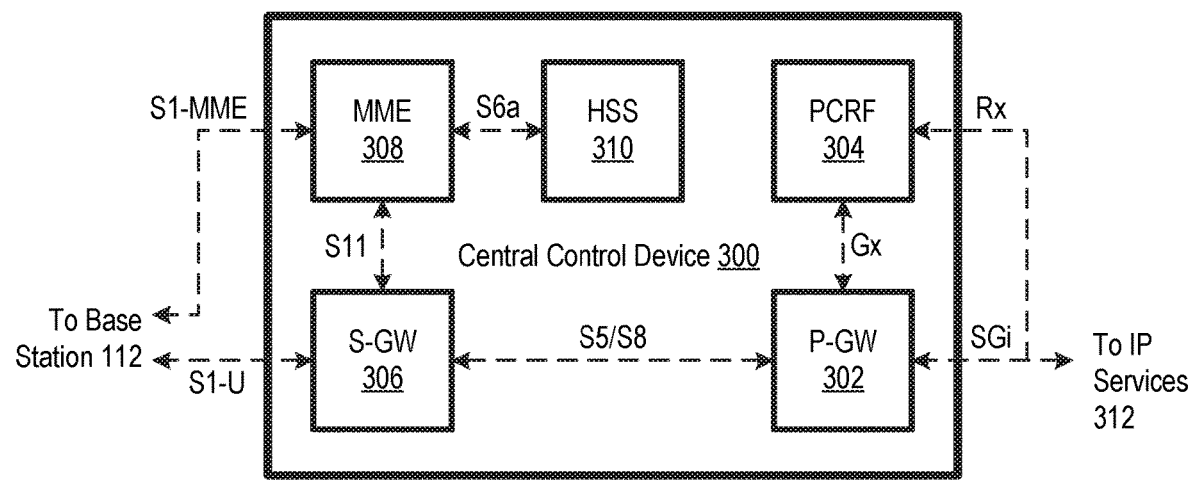
FIG. 3 is a schematic diagram of another central control device, according to an embodiment.

FIGS. 2 and 3 illustrate one possible embodiment of central control device 106 and central control device 110, respectively. It should be appreciated, however, that control device 106 and central control device 110 are not limited to the embodiments of FIGS. 2 and 3 or even to an EPC. To the contrary, central control device 106 and central control device 110 could have essentially any configuration as long as they support communication between base stations 108 and 112, communication between systems or entities that control (directly or indirectly) base stations 108 and 112, or system or entities that facilitate communication between base stations 108 and 112, as discussed below.

FIG. 2 is a schematic diagram of a central control device 200, which is one embodiment of central control device 106 of FIG. 1 configured as an EPC. Central control device 200 includes a PDN Gateway (P-GW) 202, a Policy Control and Charging Rules Function (PCRF) 204, a Serving Gateway (S-GW) 206, a Mobility Management Entity (MME) 208, and a Home Subscriber Server (HSS) 210. P-GW 202 is communicatively coupled to PCRF 204 via an interface Gx, and P-GW 202 is communicatively coupled to S-GW via an interface S5/S8. MME 208 is communicatively coupled to S-GW 206 via an interface S11, and MME 208 is communicatively coupled to HSS 210 via an interface S6a. MME 208 and S-GW 206 are communicatively coupled to base station 108 via interfaces S1-MME and S1-U, respectively. In the event wireless communication network 102 includes additional base stations (not shown), interfaces S1-MME and S1-U are communicatively coupled to each base station. Two or more elements of central control device 200 could be combined without departing from the scope hereof. Additionally, central control device 200 could include additional elements. For example, in some embodiments, central control device 200 includes multiple instances of MME 208 forming a pool of MMES. In particular embodiments, the elements of control device 200 are implemented by one or more processors (not shown) executing instructions stored in one or more memories (not shown).

PCRF 204, for example, performs policy control decision making and controls flow-based charging in a Policy Control Enforcement Function (PCEF) (not shown) in P-GW 202. In some embodiments, PCRF 204 also performs Quality of Service (QoS) authorization to determined how data flow is handled in P-GW 202. PCRF 204 is communicatively coupled to IP Services 212 via an interface Rx. IP Services 212 include services available to subscribers of wireless communication network 102 that are not part of wireless communication network 102.

In particular embodiments, P-GW 202 allocates Internet Protocol (IP) addresses to UE devices (e.g., UE device 114) and enforces QoS and flow-based charging according to PCRF 204. P-GW 202 may also filter downlink user IP packets into different QoS-based bearers for transmission to UE devices. P-GW 202 is communicatively coupled to IP Services 212 via a SGi interface. In some embodiments, S-GW 206 transfers user IP packets from central control device 200 to base station 108 (an any additional base stations in wireless communication network 102). S-GW 206 also, for example, (a) retains information about bearers when an UE device is in its idle state, (b) temporarily buffers downlink data while MME 208 pages the UE device to re-establish bearers, and (c) perform administrative functions associated with a visiting UE device in wireless communication network 102.

MME 208, for example, processes signaling between central control device 200 and UE devices (e.g., UE device 114). In certain embodiments, MME 208 handles establishment, maintenance, and release of bearers, as well as connection and security management. In some embodiments, HSS 210 houses subscriber data, such as subscriber QoS profiles and subscriber roaming permissions, as well as dynamic subscriber information, such as identity of a MME that a UE device 104 is connected to.

Central control device 300 is communicatively coupled between IP Services 312 and base station 112. Central control device 300 includes a P-GW 302, a PCRF 304, a S-GW 306, a MME 308, and a HSS 310, which are analogous to P-GW 202, PCRF 204, S-GW 206, MME 208, and HSS 210, respectively.

Figure 4:
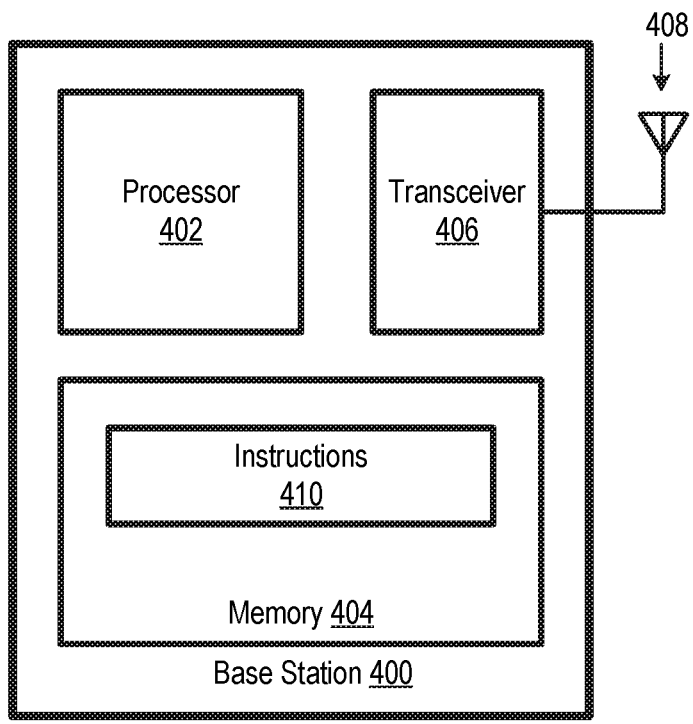
FIG. 4 is a schematic diagram of a base station of a wireless communication system, according to an embodiment.
Figure 5:
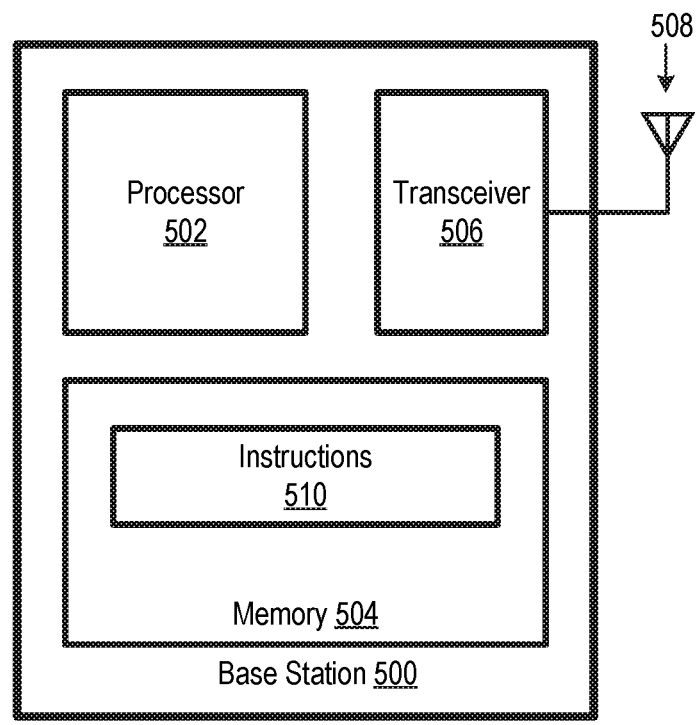
FIG. 5 is a schematic diagram of another base station of a wireless communication system, according to an embodiment.

FIGS. 4 and 5 illustrate one possible embodiment of base station 108 and base station 112, respectively. It should be appreciated, however, that base station 108 and base station 112 are not limited to the embodiments of FIGS. 4 and 5. Instead, base stations 108 and 112 could have essentially any configuration as long as they support communication between themselves, as discussed below.

FIG. 4 is a schematic diagram of a base station 400, which is one embodiment of base station 108. Base station 400 includes a processor 402, a memory 404, a transceiver 406, and an antenna 408. Processor 402 is configured to execute instructions 410 stored in memory 404 to control base station 400. Transceiver 406 is communicatively coupled to antenna 408, and transceiver 406 interfaces antenna 408 with other components of base station 400. For example, in some embodiments, transceiver 406 converts electrical signals generated by processor 402 into RF signals for transmission to UE devices via antenna 408, and transceiver 406 converts RF signals received from UE devices via antenna 408 into electrical signals for processor 402. One or more elements of base station 400 may include multiple sub-elements. For example, processor 402 could include a plurality of sub-processors, memory 404 could include a plurality of memory modules, and antenna 408 could include multiple radiating/receiving elements. Additionally, processor 402 and memory 404 could be replaced with other circuitry, e.g. analog and/or digital electronic circuitry, performing similar functions to processor 402 and memory 404. Furthermore, although base station 400 is illustrated as being a self-contained device, two or more elements of base station 400 could be distributed among multiple locations. For example, processor 402 and memory 404 could be located at a different location than transceiver 406 and antenna 408. Moreover, multiple instances of base station 400 could share one or more elements without departing from the scope hereof.

FIG. 5 is a schematic diagram of a base station 500, which is one embodiment of base station 112. Base station 500 includes a processor 502, a memory 504, a transceiver 506, and an antenna 508, which are analogous to processor 402, memory 404, transceiver 406, and antenna 408, respectively. Processor 502 is configured to execute instructions 510 stored in memory 504 to control base station 500, in a manner similar to that discussed above with respect to FIG. 4. One or more elements of base station 500 may include multiple sub-elements. For example, processor 502 could include a plurality of sub-processors, memory 504 could include a plurality of memory modules, and antenna 508 could include multiple radiating/receiving elements. Additionally, processor 502 and memory 504 could be replaced with other circuitry, e.g. analog and/or digital electronic circuitry, performing similar functions to processor 502 and memory 504. Furthermore, although base station 500 is illustrated as being a self-contained device, two or more elements of base station 500 could be distributed among multiple locations. For example, processor 502 and memory 504 could be located at a different location than transceiver 506 and antenna 508. Moreover, multiple instances of base station 500 could share one or more elements without departing from the scope hereof.

Referring again to FIG. 1, base stations 108 and 112 are collectively configured to establish a communication interface 122 between each other, to allow base stations 108 and 112 to communicate with each other. In some embodiments, communication interface 122 includes a dedicated communication link between base station 108 and 112 (e.g. an optical communication link and/or a RF communication link), and in some embodiments, communication interface 122 is a logical interface that does not require a direct connection between base station 108 and base station 112. In certain embodiments, communication interface 122 enables base stations 108 and 112 to communicate with each other with minimal or no assistance from central control devices 106 and 110 or any other intermediary, which advantageously promotes low-latency communication between base stations 108 and 112. In particular embodiments, base stations 108 and 112 use communication interface 122 for one or more of (a) coordinating a handover of UE device 114 from base station 108 to base station 112 (or vice versa) and (b) coordinating use of RF spectrum shared by base stations 108 and 112 to prevent interference between the two base stations and/or to help optimize use of shared RF spectrum. In some embodiments, base stations 108 and 112 use communication interface 122 multiple times after it is established.

In this document, communication between base stations, e.g., between base stations 108 and 112, includes but is not limited to communication between respective Internet Protocol (IP) layers of the base stations. In embodiments where a base station 108 or 112 is a remote base station (e.g., a remote small cell), the base station's respective IP layer is optionally located at a central base station (e.g., a central cell).

Figure 6:
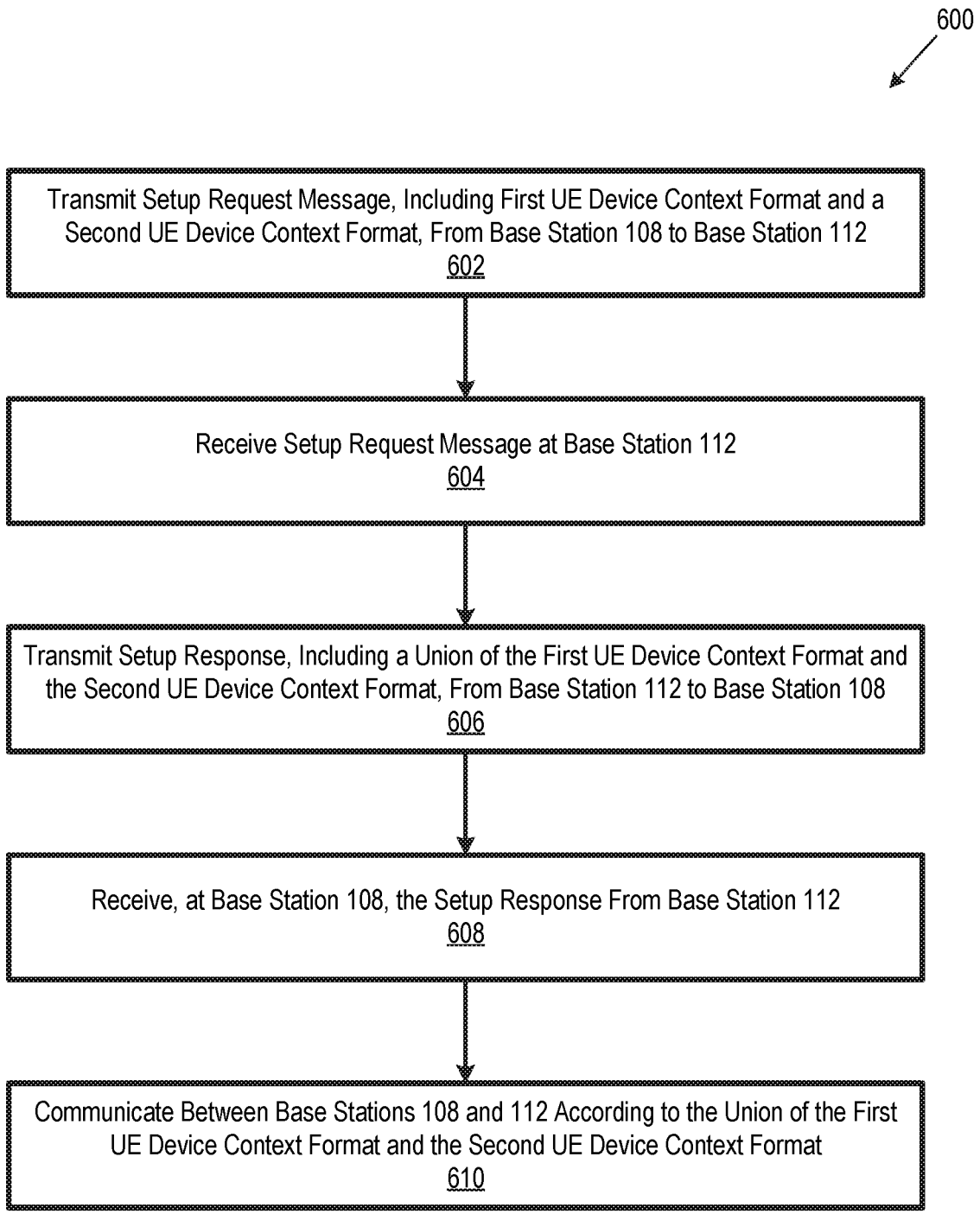
FIG. 6 is a flow chart illustrating a method for communicating between base stations of two different wireless communication networks, according to an embodiment.

In certain embodiments, base stations 108 and 112 execute a method 600 of FIG. 6 to establish communication interface 122 and to communicate between the base stations. For example, in embodiments where base stations 108 and 112 are respectively embodied by base stations 400 and 500, processor 402 executes instructions 410 and processor 502 executes instructions 510, to execute method 600. In block 602 of method 600, base station 108 transmits a setup request message to base station 112. The setup message request includes, in part, a first UE device context format and a second UE device context format. The first UE device context format represents how a UE device context is represented in wireless communication network 102, and the second UE device context format represents how a UE device context is represented in wireless communication network 104. Base station 108 obtains the first UE device context format and the second UE device context format, for example, from central control device 106.

In block 604, base station 112 receives the setup request message from base station 108. In block 606, base station 112 transmits a setup response to base station 108. The setup response includes a union of the first UE device context format and the second UE device context format. Each of the first UE device context format and the second UE device context format includes one or more respective information fields. Some possible examples of UE device context information fields include, but are not limited to, UE device status, UE device type, UE device location, UE device connections (e.g., UE device data bearers), evolved packet system (EPS) security context (e.g., security keys, security mode), authentication quadruplets or quintuplets, UE device network capabilities, PDN connection information, EPS bearer identification, Internet Protocol (IP) address, and/or aggregate maximum bit rate (AMBR). As one example of the union of UE device context formats, assume a scenario where the first UE device context format includes information fields A, B, and C, and the second UE device context format includes information fields A, C, and D. The union of the first UE device context format and the second UE device context format includes information fields A, B, C, and D, i.e., a superset of the information fields of the two UE device context formats. In block 608, base station 108 receives the setup response from second base station 112.

In block 610, base stations 108 and 112 communicate with each other according to the union of the first UE device context format and the second UE device context format. For example, in some embodiments, base station 108 includes data for all information fields of the union of UE device context formats when sending a message to base station 112, and base station 112 includes data for all information fields of the union of UE device context formats when sending a message to base station 108. Such inclusion of all information fields of the union in messages sent between base station 108 and base station 112 advantageously enables the two base stations to communicate with each other if the two base stations use different UE device context formats.

Figure 7A:
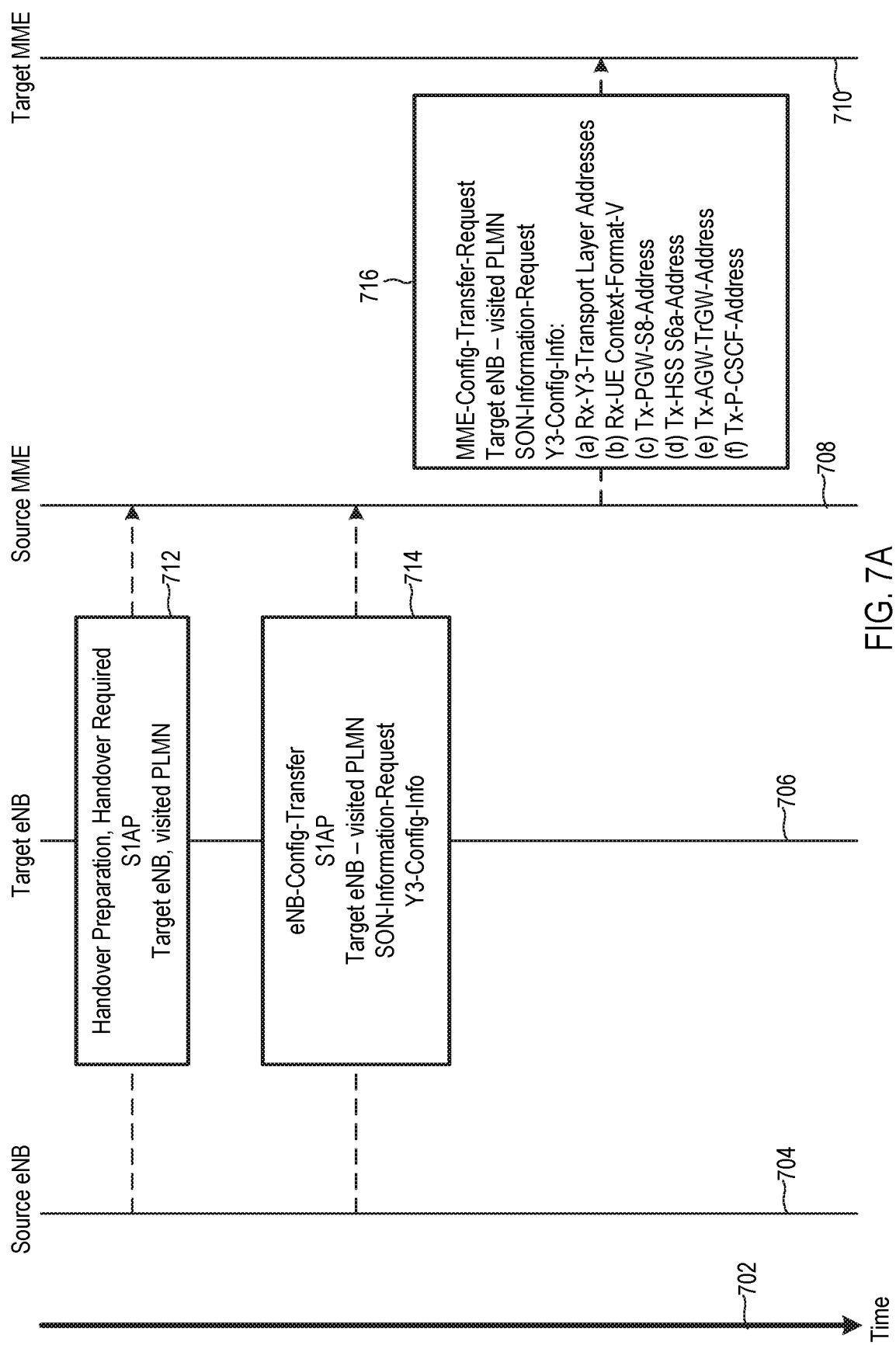
FIGS. 7A-7C collectively form a timing diagram illustrating a method for establishing a communication interface between two base stations of different respective wireless communication networks, according to an embodiment.
Figure 7B:
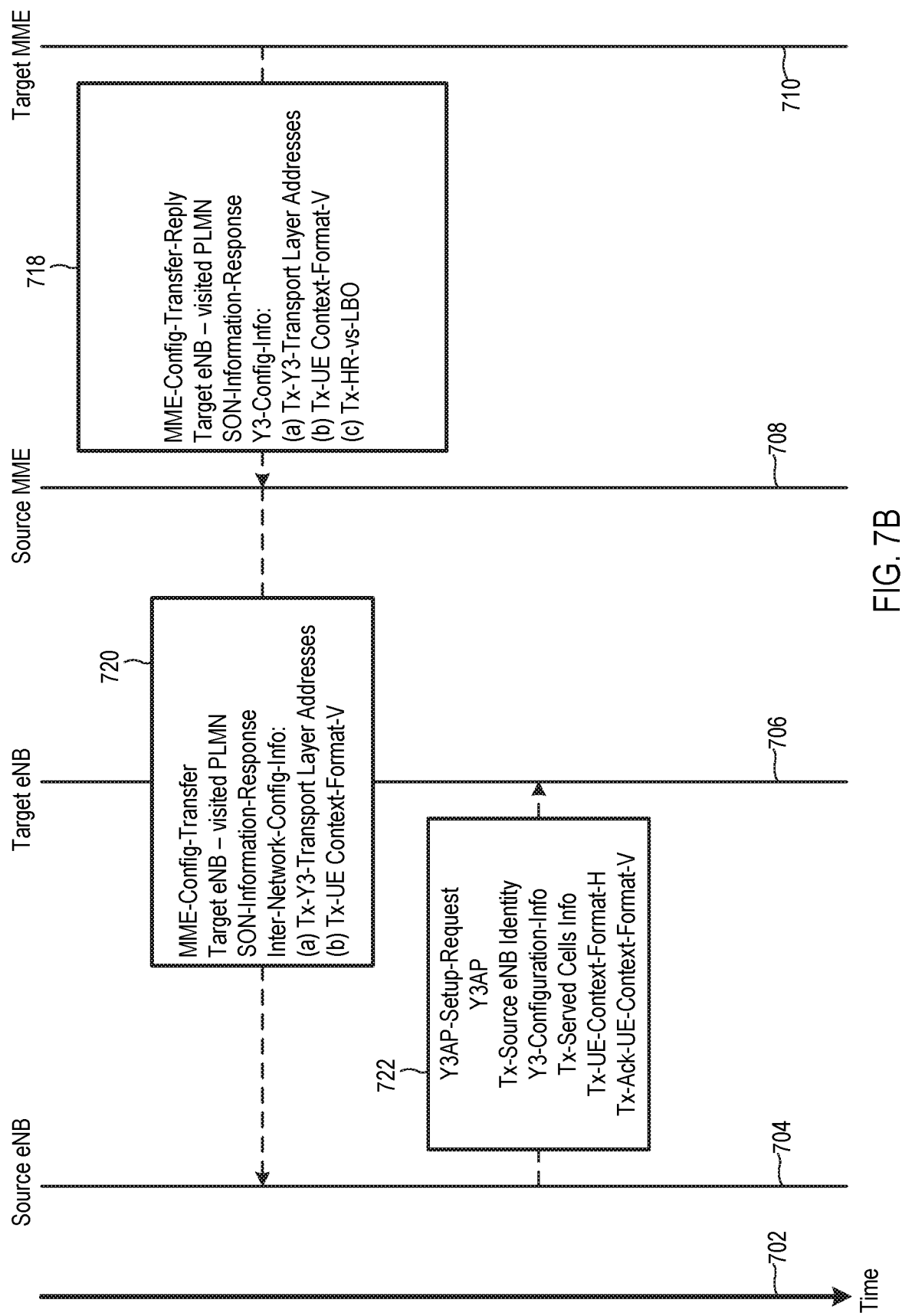
Figure 7C:
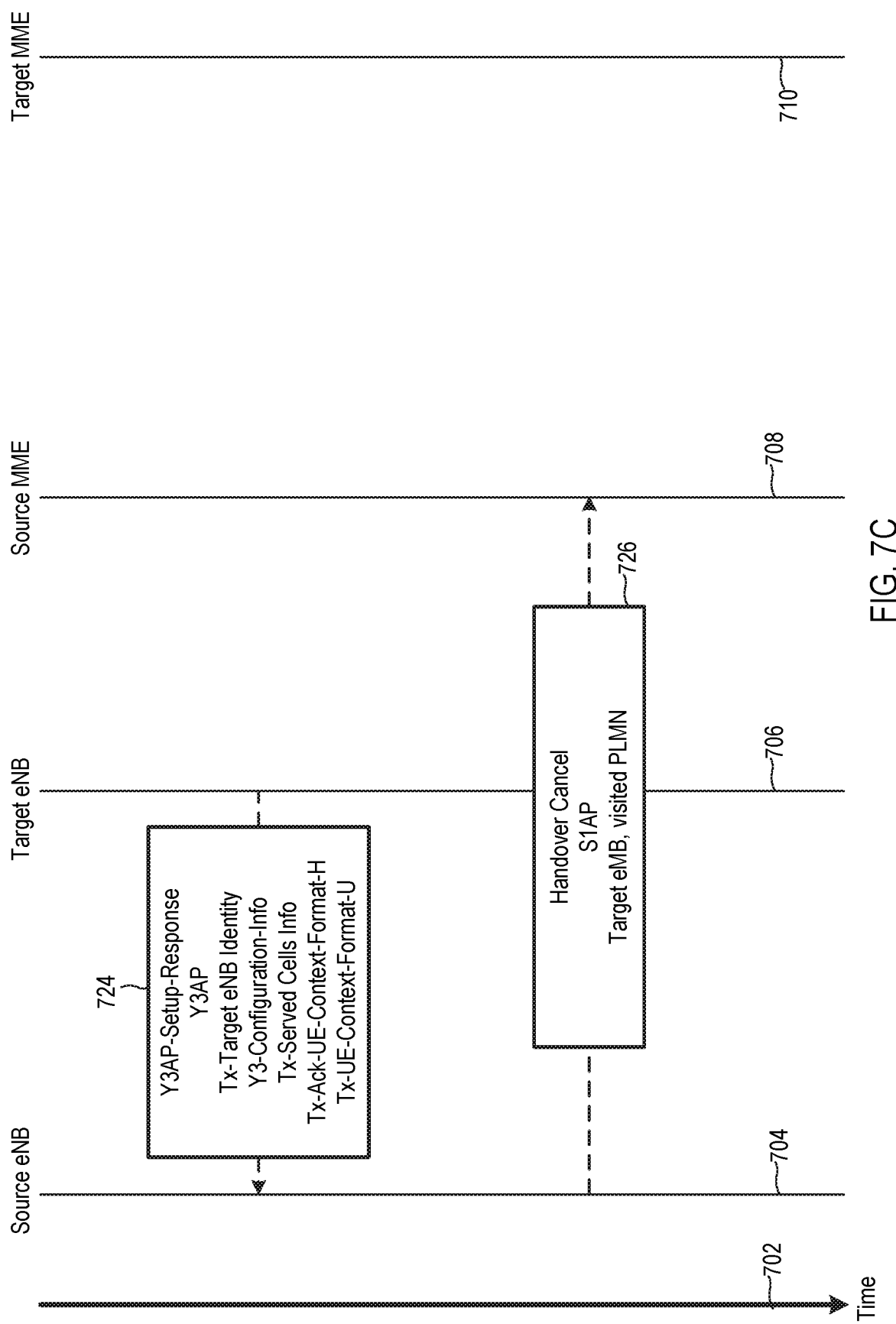

FIGS. 7A-7C collectively illustrate an example of a method for establishing a communication interface between base stations of two different wireless communication networks. For example, the method of FIGS. 7A-7C may be used to establish interface 122 between base stations 108 and 112 in an embodiment where central control devices 106 and 110 are embodied as illustrated in FIGS. 2 and 3, respectively. Accordingly, the method FIGS. 7A-7C is one embodiment of method 600 of FIG. 6. In embodiments where base stations 108 and 112 are respectively embodied by base stations 400 and 500, processor 402 executes instructions 410 and processor 502 executes instructions 510, to execute the method illustrated in FIGS. 7A-7C. In the example of FIGS. 7A-7C, the base stations are eNBs. For example, the source eNB may be base station 108 configured as an eNB, and the target eNB may be base station 112 configured as an eNB. Additionally, the source MME may be MME 208, and the target MME may be MME 308. However, the method of FIGS. 7A-7C could be adapted for use with a different type of base stations, e.g., gNB base stations, as well as for different central control device configurations. In FIGS. 7A-7C, vertical axis 702 represents time, and vertical lines 704, 706, 708, and 710 logically represent the source eNB, the target eNB, the source MME, and the target MME, respectively.

The method of FIGS. 7A-7C begins with the source eNB transmitting a hand over request message 712 to the source MME. Message 712 is transmitted according to a S1 interface application protocol (AP), e.g., over the S1-MME interface of FIG. 2, and message 712 advises the source MME that the source eNB wishes to initiate a handover of a UE device (e.g., UE device 114) from the source eNB to the target eNB. Message 712 includes identity of the target eNB and the identity of the visited wireless communication network (e.g., wireless communication network 104), which is sometimes referred to as a Public Land Mobile Network (PLMN).

The source eNB next sends a eNB-Config-Transfer message 714 to the source MME using a S1 AP, e.g., over the S1-MME interface of FIG. 2. Message 714 again includes identity of the target eNB and the visited PLMN. Message 714 additionally includes a SON-Information-Request and a Y3-Config-Info request. The SON-Information-Request is, for example, a SON-Information-Request specified in LTE standards or in similar standards, where SON refers to self-optimizing networks. The Y3-Config-Info is information needed to establish an interface between base stations of two different wireless communication networks (e.g., interface 122 between base stations 108 and 112). This interface is referred to as "Y3" for brevity, although it should be understood that use of term Y3 is not intended to restrict the interface to any particular protocol, physical layer configuration, or wireless communication standard. One example of a Y3 interface is interface 122 of FIG. 1.

The source MME next sends a MME-Config-Transfer-Request message 716 to the target MME, e.g., using interface 112 of FIG. 1. Message 716 includes, for example, the same information included in message 714. FIG. 7A illustrates one example of Y3-Config-Info in message 716. In this example, Y3-Config-Info includes the following information, although the content of Y3-Config-Info may vary without departing from the scope hereof: (a) Rx-Y3-Transport Layer Addresses, (b) Rx-UE Context-Format-V, (c) Tx-PGW-S8-Address, (d) Tx-Hss S6a-Address, (e) Tx-AGW-TrGW-Address, and (f) Tx-P-CSCF-Address. Rx-Y3-Transport Layer Addresses is a request for transport layer addresses associated with the target eNB, and Rx-UE Context-Format-V is a request for the UE device context format of the visited wireless communication network (e.g., the second UE device context format discussed above with respect to FIG. 4). Tx-PGW-S8-Address is a notification of the address of the source P-GW (e.g., P-GW 210), and Tx-Hss S6a-Address is a notification of the address of the source HSS (e.g., HSS 210). Tx-AGW-TrGW-Address is a notification of the address of the source access gateway, which includes addresses of the source S-GW and P-GW (e.g., S-GW 206 and P-GW 202). Tx-P-CSCF-Address is a notification of an address of a call session control function (CSCF) of the home network (e.g., wireless communication network 102).

The target MME sends a MME-Config-Transfer-Reply message 718 to the source MME (FIG. 7B). Message 718 confirms the target eNB identity and the visited PLMN identity. Message 718 additionally provides the SON-Information Request to the home wireless communication network. Furthermore, message 718 includes at least some Y3-Config-Info. In the illustrated example, message 718 includes the following Y3-Config-Info, although the content of Y3-Config-Info in message 718 may vary without departing from the scope hereof: (a) Tx-Y3-Transport Layer Addresses, (b) Tx-UE Context-Format-V, and (c) Tx-HR-vs-LBO. Tx-Y3-Transport Layer Addresses is notification of the address of the target eNB, Tx-UE Context-Format-V is notification of the UE device context format of visited wireless communication network, and (c) Tx-HR-vs-LBO is notification of whether the visited wireless network prefers home routing (HR) or local break-out (LBO) operation. HR refers to when a UE on a visited network uses the P-GW of its home network, and LBO refers to when a UE on a visited network use the P-GW of the visited network.

Source MME 720 transmits a MME-Config-Transfer message 720 to the source eNB. Message 720 is similar to message 718 but with Inter-Network-Config-Info replacing Y3-Config-Info. In the illustrated example, message 720 includes the following Inter-Network-Config-Info, although the content of Inter-Network-Config-Info in message 720 may vary without departing from the scope hereof: (a) Tx-Y3-Transport Layer Addresses, (b) Tx-UE Context-Format-V.

The source eNB is ready to negotiate the Y3 interface after receiving message 720 from the source MME. Accordingly, the source eNB transmits a Y3AP-Setup-Request message 722 to the target eNB using a Y3 AP. In some embodiments, the Y3 AP includes a message set needed to establish the Y3 AP and defining what can be communicated across the Y3 interface. In particular embodiments, message 722 includes notification of the source eNB's identity (Tx-Source eNB Identity) and Y3-Configuration-Info. In the illustrated example, message 722 includes the following Y3-Config-Info, although the content of Y3-Config-Info in message 722 may vary without departing from the scope hereof: (a) Tx-Served Cells Info, (b) Tx-UE-Context-Format-H, and (c) Tx-Ack-UE-Context-Format-V. Tx-Served Cells Info is notification of cells served by the source eNB, and Tx-UE-Context-Format-H is UE context format of the home wireless communication network (including the source eNB). Tx-Ack-UE-Context-Format-V is an acknowledgement from the source eNB that it is aware of the visited network's UE context format.

The target eNB responds to message 722 by sending a Y3AP-Setup-Response message 724 using the Y3 AP to the source eNB (FIG. 7C). Message 724 includes, for example, notification of the target eNB's identity (Tx-Target eNB Identity) and Y3-Configuration-Info. In the illustrated example, message 724 includes the following Y3-Config-Info, although the content of Y3-Config-Info in message 724 may vary without departing from the scope hereof: (a) Tx-Served Cells Info, (b) Tx-Ack-UE-Context-Format-H, and (c) Tx-UE-Context-Format-U. Tx-Served Cells Info is notification of cells served by the target eNB, and Tx-Ack-UE-Context-Format-H is an acknowledgement from the target eNB that it is aware of the home network's UE context format. Tx-UE-Context-Format-U is the union of UE-Context-Format-H and UE-Context-Format-V, i.e., the union of the UE device context format of the home network and the UE device context format of the visited network.

Receipt of message 724 by the source eNB concludes negotiation of the Y3 interface between the source eNB and the target eNB. The two eNBs can subsequently use the interface to communicate, e.g., to coordinate handover of a UE device and/or to coordinate use of shared RF spectrum. The two eNBs use UE-Context-Format-U when communicating with respect to a UE, to enable such communication in cases where the home and visited networks use different UE context formats.

The source eNB sends a handover cancel message 726 to the source MME after receipt of message 724, to cancel the S1 handover initiated by message 712, using a S1 AP. Message 726 includes identity of the targeted eNB and the visited PLMN.

Figure 8:
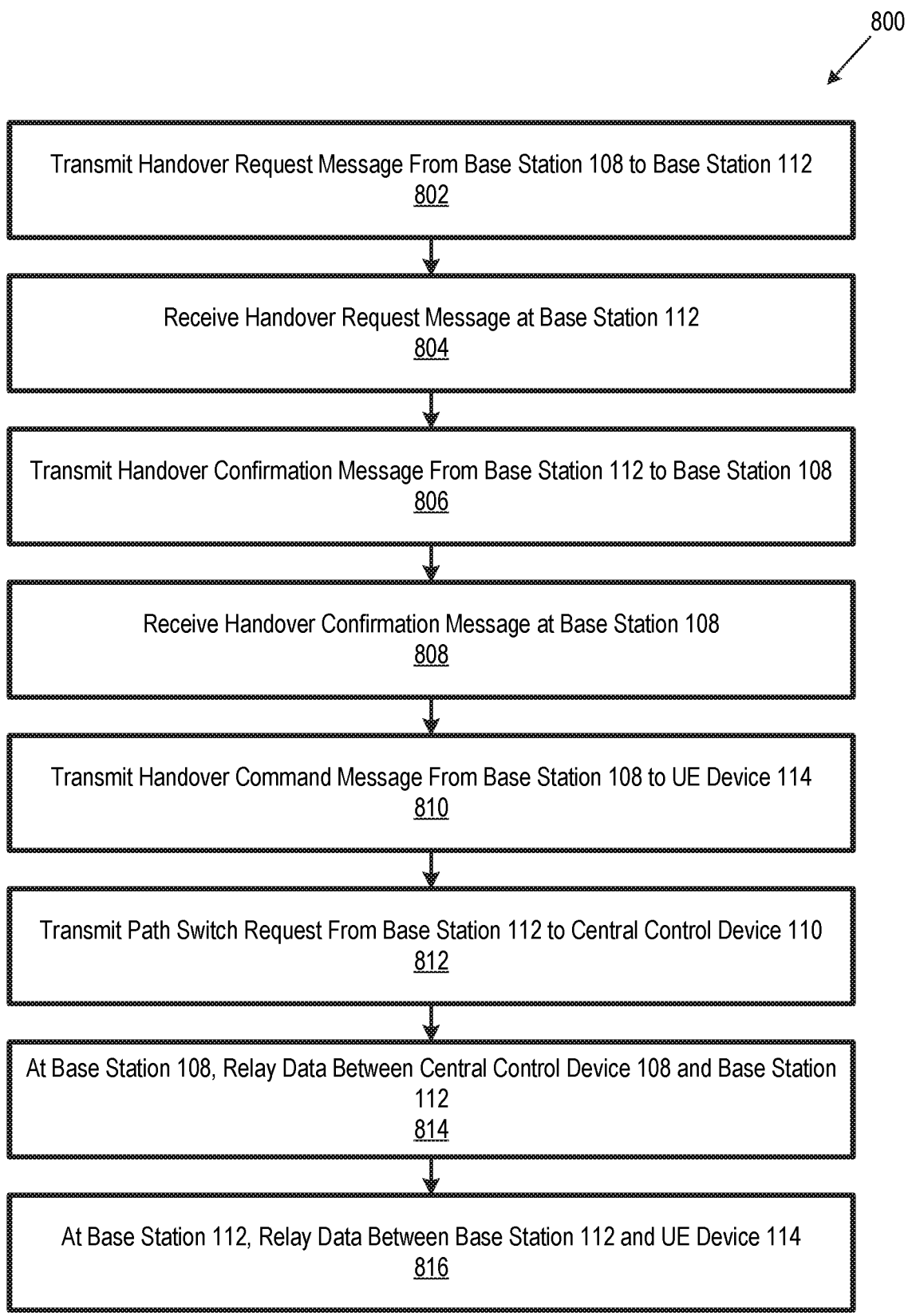
FIG. 8 is a flow chart illustrating a method for coordinating a handover of a UE device between respective base stations of two different wireless communication networks, according to an embodiment.

FIG. 8 is a flow chart illustrating a method 800 for coordinating handover of a UE device between base stations 108 and 112. Method 800 is performed, for example, after interface 122 is established between the two base stations, e.g., using the method of FIG. 6 or the method of FIGS. 7A-7C. In embodiments where base stations 108 and 112 are respectively embodied by base stations 400 and 500, processor 402 executes instructions 410 and processor 502 executes instructions 510, to execute method 800.

In block 802, base station 108 transmits a handover request to base station 112 using interface 122 between base station 108 and base station 112, and base station 112 receives the handover request in block 804. Base station 112 transmits a handover confirmation request to base station 108 in block 806, in response to receiving the handover request in block 804. Base station 108 receives the handover confirmation message in block 808, and base station 108 responds by transmitting a handover command message to UE device 114 in block 810. The handover command message commands UE device 114 to disconnect from base station 108 and connect to base station 112.

Base station 112 transmits a path switch request to central control device 110 in block 812. The path switch requests instructs central control device 110 to direct data associated with UE device 114 to base station 112, since UE device 114 is connected to base station 112 after base station 108 transmits the handover command message to UE device 114. In block 814, base station 108 relays data associated with UE device 114 between first central control device 106 and base station 112, during the handover. In block 816, second base station 112 relays data between first base station 108 and base station 112, during the handover.

Although FIG. 8 illustrates blocks 802-816 being disposed in a linear sequence, these blocks need not necessarily be executed in the illustrated sequence. For example, blocks 810 and 812 could be executed in parallel, or block 812 could be executed before block 810.

Figure 9A:
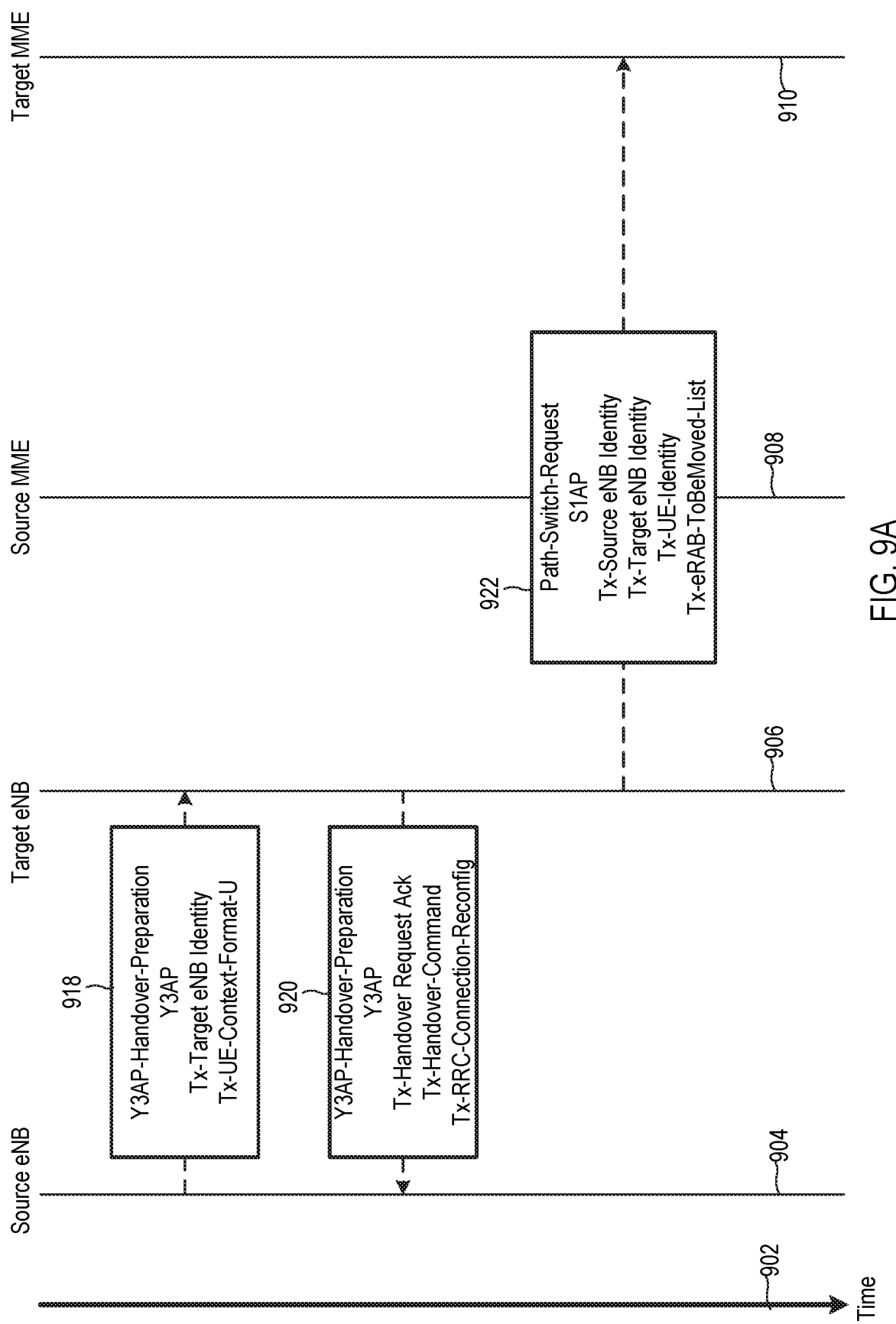
FIGS. 9A-9C collectively form a timing diagram illustrating another method for coordinating a handover of a UE device between respective base stations of two different wireless communication networks, according to a network.
Figure 9B:
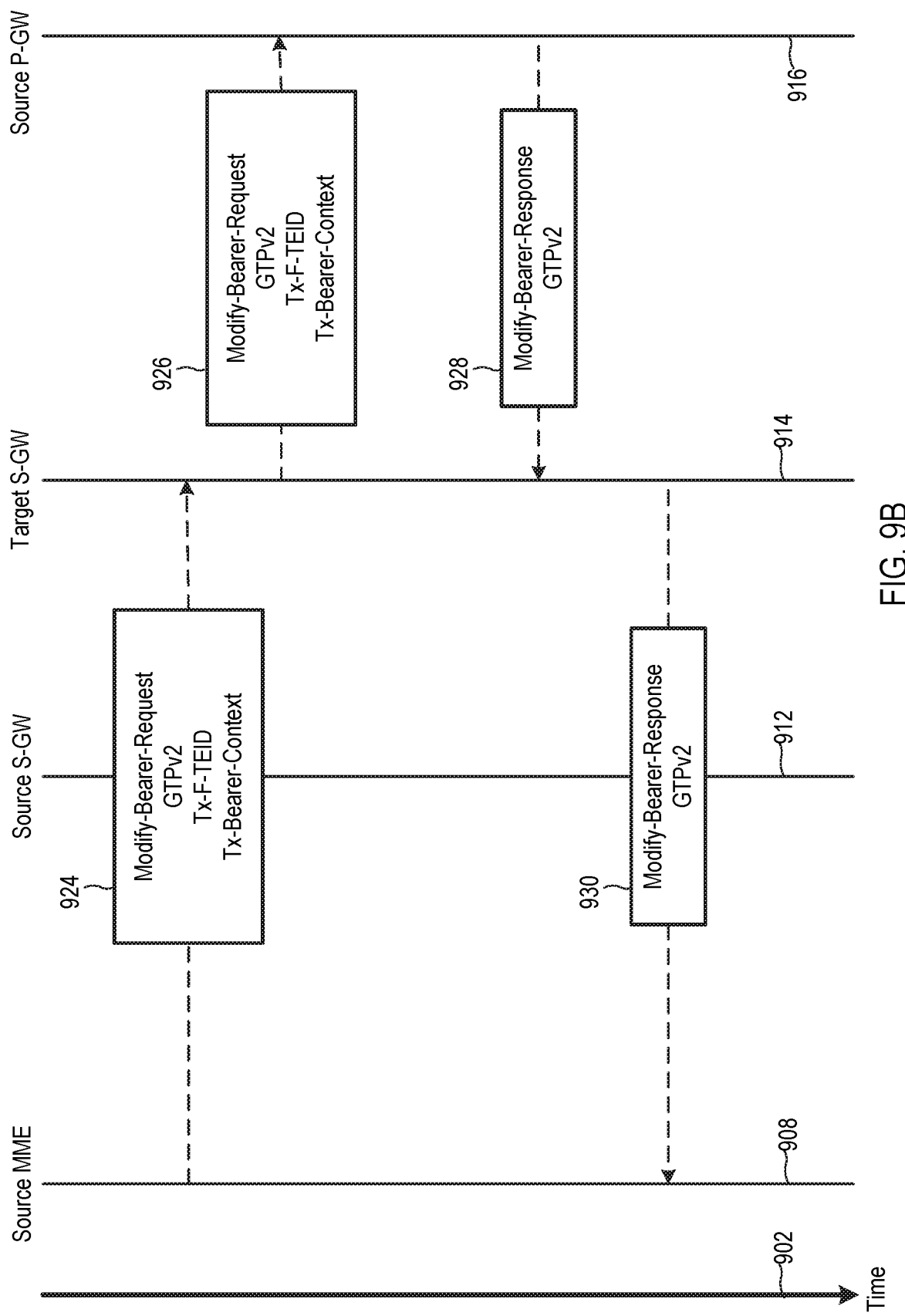
Figure 9C:
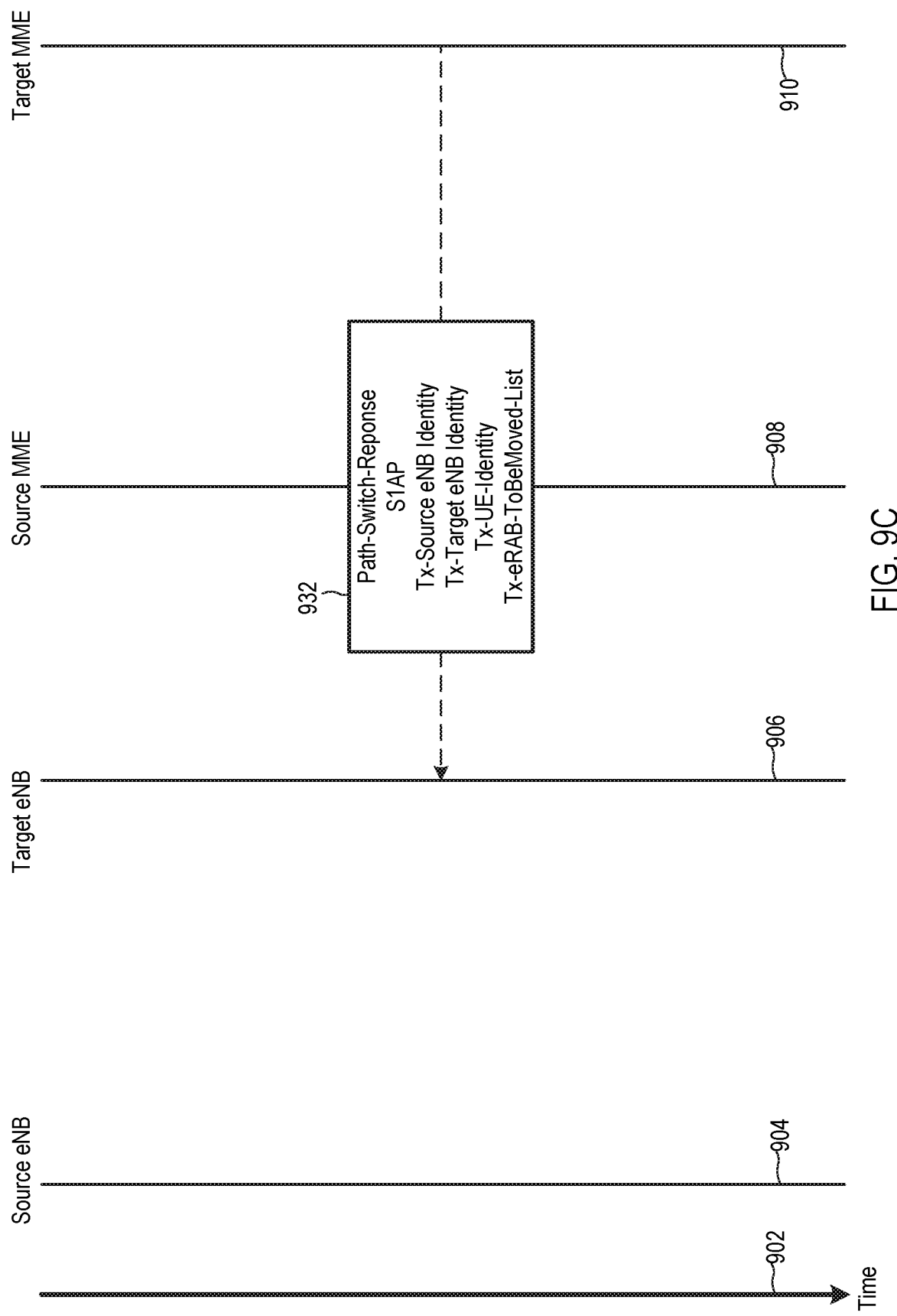

FIGS. 9A-9C collectively illustrate an example of a method for coordinating handover of a UE device between base stations of different wireless communication networks using home routing. Accordingly, the method of FIGS. 9A-9C is one embodiment of method 800 of FIG. 8. In embodiments where base stations 108 and 112 are respectively embodied by base stations 400 and 500, processor 402 executes instructions 410 and processor 502 executes instructions 510, to execute the method illustrated in FIGS. 9A-9C. In the example of FIGS. 9A-9C, the base stations are eNBs. For example, the source eNB may be base station 108 configured as an eNB, and the target eNB may be base station 112 configured as an eNB. Additionally, the source MME may be MME 208, the target MME may be MME 308, the source S-GW may be S-GW 206, the target S-GW may be S-GW 306, and the source P-GW may be P-GW 202. However, the method of FIGS. 9A-9C could be adapted for use with a different type of base stations, e.g., gNB base stations, as well as for different central control device configurations. In FIGS. 9A-9C, vertical axis 902 represents time, and vertical lines 904, 906, 908, 910, 912, 914, and 916 logically represent a source eNB, a target eNB, a source MME, a target MME, a source S-GW, a target S-GW, and a source P-GW, respectively.

The method of FIGS. 9A-9C begins with the source eNB transmitting a Y3AP-Handover-Preparation message 918, to request handover of a UE device, using the Y3 AP. Message 918 includes Tx-Target eNB Identity and Tx-UE-Context-Format-U, as discussed above with respect to FIGS. 7A-7C. The source eNB transmits message 918, for example, in response to determining that the UE device would be better served by the target eNB than the source eNB. The target eNB responds to message 918 by transmitting a Y3AP-Handover-Preparation message 920 using the Y3 AP. Message 920 includes (a) Tx-Handover Request Ack, (b) Tx-Handover-Command, and (c) Tx-RRC-Connection-Reconfig. Tx-Handover Request Ack is an acknowledgement from the target eNB of the handover request, and Tx-Handover-Command is a command from the target eNB to the source eNB to begin the handover process. Tx-RRC-Connection-Reconfig is a command to the source eNB to cause the UE device (e.g., UE device 114) to reconfigure its radio resource control (RRC) for operation with the source eNB. The source eNB sends implements Tx-RRC-Connection-Reconfig, for example, by sending a handover command message from the first base station to the UE device.

The target eNB next sends a Path-Switch-Request message 922 to the target MME via a S1 AP. Message 922 includes, for example, Tx-Source eNB Identity, Tx-Target eNB Identity, Tx-UE-Identity, and Tx-eRAB-ToBeMoved-List. Tx-Source eNB Identity is notification of the source eNB's identity, Tx-Source eNB Identity is notification of the target eNB's identity, and Tx-UE-Identity is notification of the UE's identity. Tx-eRAB-ToBeMoved-List is notification of radio bearers associated with the UE which will need to be handled by the target MME. The source MME next transmits a Modify-Bearer-Request message 924 to the Target S-GW via a GPRS tunneling protocol (GTP), e.g., via GTPv2, including Tx-F-TEID and Tx-Bearer-Content (FIG. 9B). Tx-F-TEID is notification of the Fully Qualified Tunnel End Point Identifier (F-TEID), and Tx-Bearer-Content is notification of the characteristics of the bearers that will need to be handled by the Target S-GW. The target S-GW then sends a Modify-Bearer-Request message 926 to the Source P-GW via GTPv2, to set-up home routing. In particular embodiments, message 926 includes the same information as message 924.

The source P-GW acknowledges receipt of message 926 by sending a Modify-Bearer-Response message 928 to the Target S-GW via GTPv2, and the target S-GW in turn sends a Modify-Bearer-Response message 930 to the source MIME. The target MME then sends a Path-Switch-Response message 932 to the target eNB, including Tx-Source eNB Identity, Tx-Target eNB Identity, Tx-UE Identity, and Tx-eRAB-ToBeMoved-List (FIG. 9C). Tx-Source eNB Identity, Tx-Target eNB Identity, and Tx-UE Identity are the same as discussed above, and Tx-eRAB-ToBeMoved-List is a list of radio bearers associated with the UE device to be handled by the target eNB. The UE device is now connected to the target eNB with home routing through the source P-GW.

Figure 10A:
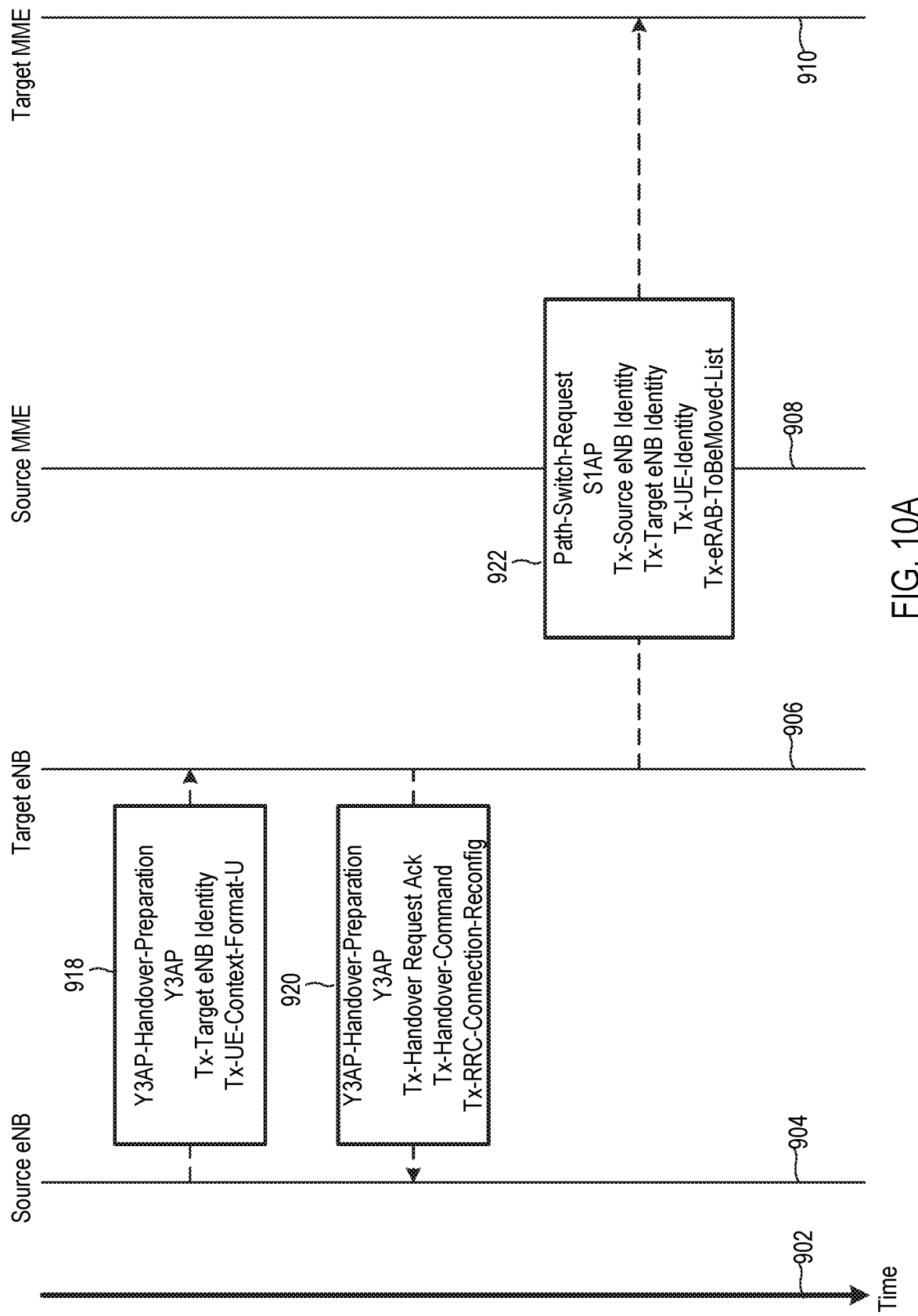
FIGS. 10A-10C collectively form a timing diagram illustrating yet another method for coordinating a handover of a UE device between respective base stations of two different wireless communication networks, according to a network.
Figure 10B:
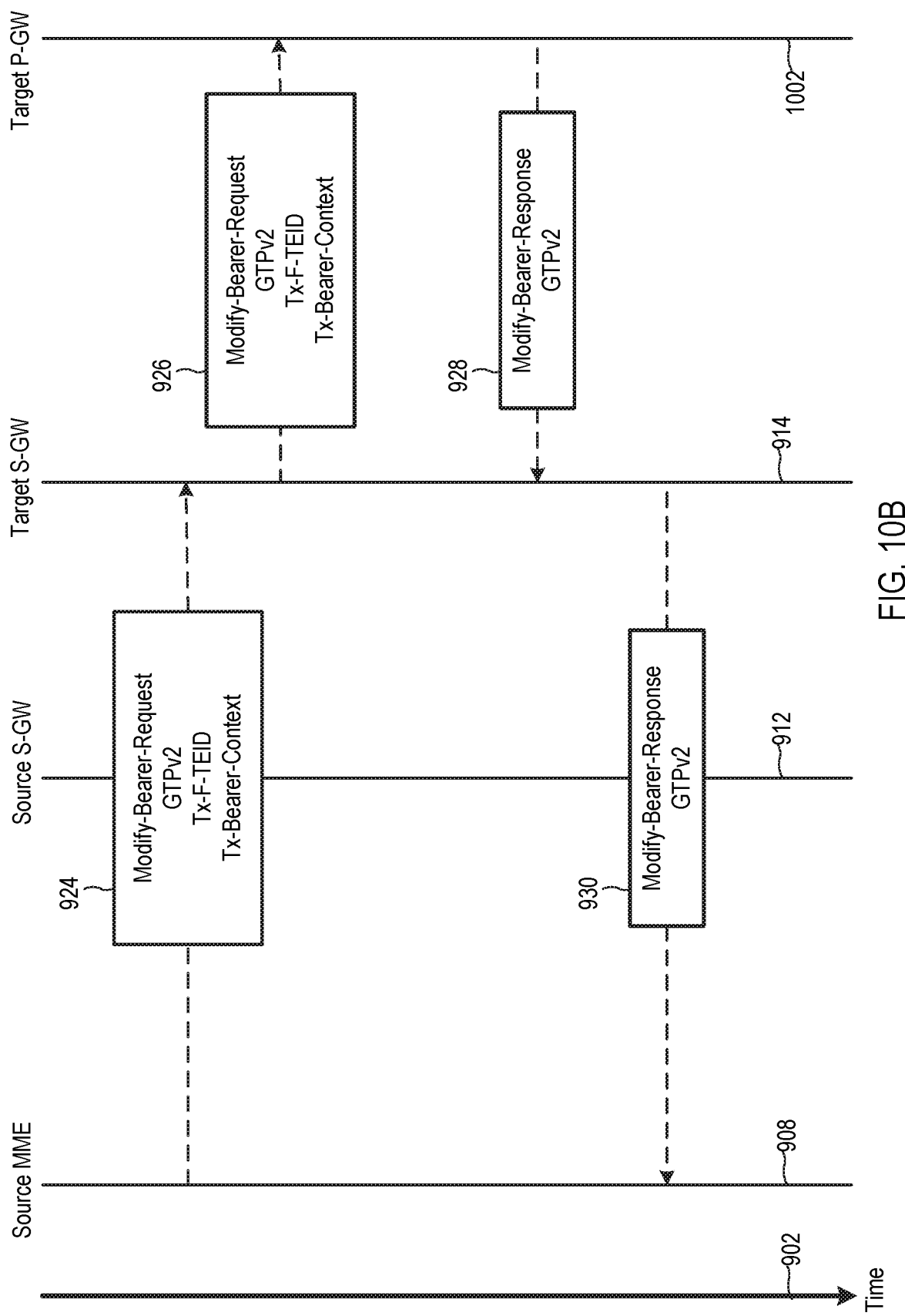
Figure 10C:
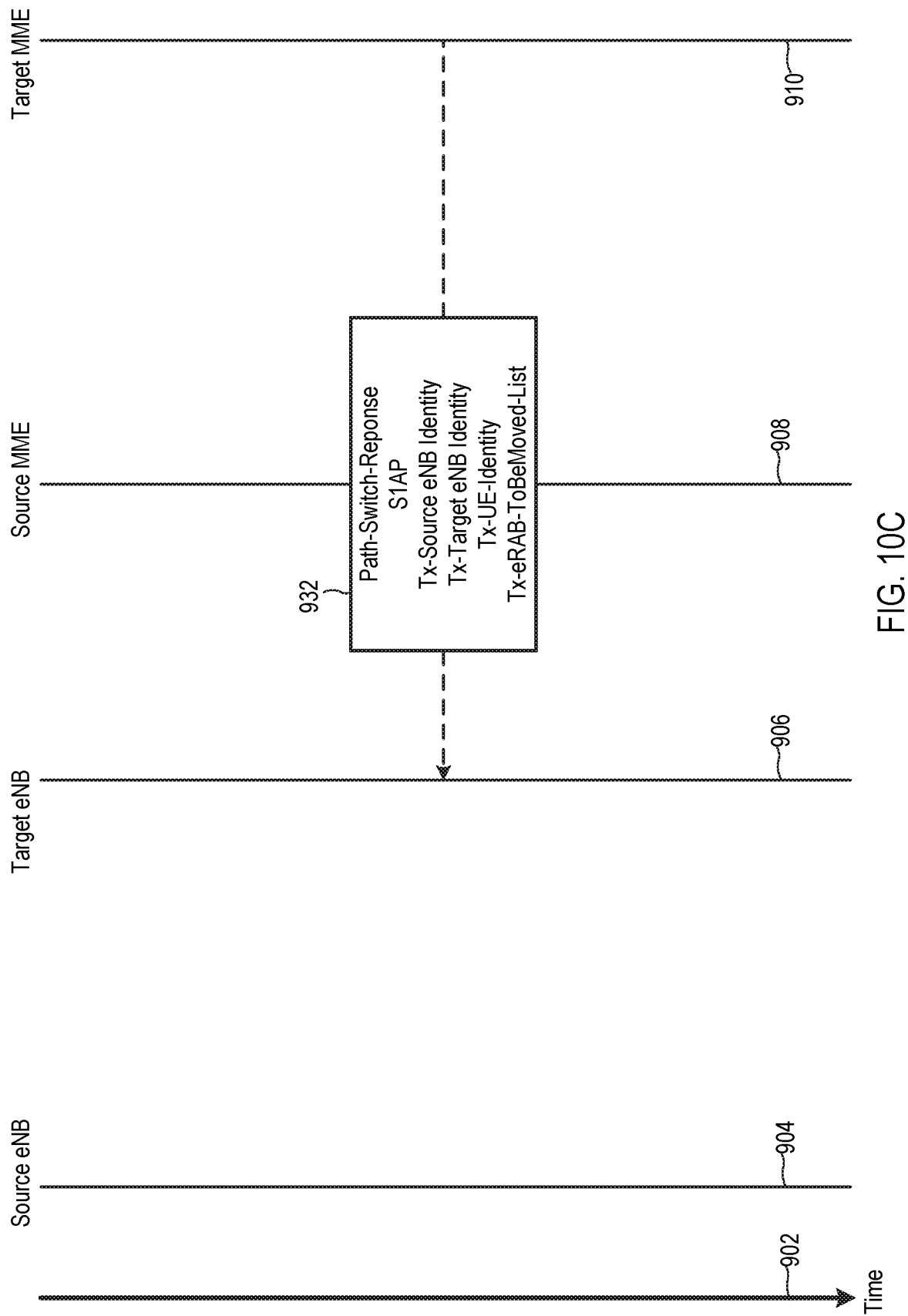

FIGS. 10A-10C collectively illustrate an example of a method for coordinating handover of a UE device between base stations of different wireless communication networks using local break-out routing. Accordingly, the method of FIGS. 10A-10C is another embodiment of method 800 of FIG. 8. The method of FIGS. 10A-10C is like the method of FIGS. 9A-9C except that (a) message 926 is transmitted to the target P-GW instead of the source P-GW, and (b) message 928 is sent from the target P-GW instead of the source S-GW. Vertical line 1002 in FIG. 10B logically represents the target P-GW.

Referring again to FIG. 1, in certain embodiments base stations 108 and 112 coordinate use of shared RF spectrum via interface 122, as discussed above. In some embodiments, base stations 108 and 112 share RF spectrum on a fairness basis. For example, in certain embodiments, the shared RF spectrum is allocated between base stations 108 and 112 in proportion to each base station's need for the spectrum. Each base station's need for the spectrum is determined, for instance, based on its respective load, such as indicated by one or more of (1) the base station's radio usage time, the base station's backhaul usage, and/or the number of UE devices supported by the base station. For example, consider a scenario where base station 108 supports 50 UE devices and base station 112 supports 25 UE devices. In this example, base station 108 supports two thirds of the total number of UE devices collectively supported by base stations 108 and 112, and base stations 108 and 112 are therefore allocated two thirds and one third of the available spectrum, respectively.

In some other embodiments, base stations 108 and 112 share RF spectrum on a market basis. For example, in certain embodiments, each base station 108 and 112 executes instructions to automatically rent shared RF spectrum according to market price for RF spectrum rental. For example, base station 108 may be programed to rent a first amount of spectrum if the market price is less than a threshold value, and base station 108 may be programed to rent a second amount of spectrum if the market price is greater than or equal to the threshold value. In particular embodiments, base stations 108 and 112 automatically negotiate use of shared RF spectrum on a market basis according to predetermined rules, without involvement of an intermediary, which may advantageously promote fast and low-cost spectrum allocation.

The above-discussed concepts of sharing spectrum according to a fairness approach or a market-based approach could be applied to shared resources other than RF spectrum. For example, the approaches could be applied to allocation of capacity of an optical cable or an electrical cable shared by two or more devices.

Features described above may be combined in various ways without departing from the scope hereof. The following examples illustrate some possible combinations:

(A1) A method for communicating between base stations of two different wireless communication networks may include (1) transmitting a setup request message from an Internet Protocol (IP) layer of a first base station of a first wireless communication network to an IP layer of a second base station of a second wireless communication network, the setup request message including a first user equipment (UE) device context format of the first wireless communication network and a second UE device context format of the second wireless communication network, (2) receiving, at the IP layer of the first base station, a setup response from the IP layer of the second base station, the setup response including a union of the first UE device context format and the second UE device context format, and (3) at the IP layer of the first base station, communicating with the IP layer of the second base station according to the union of the first UE device context format and the second UE device context format.

(A2) The method denoted as (A1) may further include, before transmitting the setup request message, (1) transmitting a configuration transfer message from the IP layer of the first base station to a first central control device of the first wireless network, the configuration transfer message including a request for the second UE device context format and (2) receiving a configuration transfer response message at the IP layer of the first base station from the first central control device, the configuration transfer response message including the second UE device context format.

(A3) In the method denoted as (A2), the configuration transfer message may further include an identity of the second wireless communication network.

(A4) In any one of the methods denoted as (A2) and (A3), the configuration transfer message may further include a request for one or more addresses associated with the second wireless communication network.

(A5) Any one of the methods denoted as (A2) through (A4) may further include transmitting the configuration transfer message from the IP layer of the first base station to a Mobility Management Entity (MME) of first central control device.

(A6) Any one of the methods denoted as (A1) through (A5) may further include (1) transmitting a handover request message from the IP layer of the first base station to the IP layer of the second base station, according to the union of the first UE device context format and the second UE device context format, (2) receiving, at the IP layer of the first base station, a handover confirmation message from the IP layer of the second base station, and (3) in response to receiving the handover confirmation message at the IP layer of first base station, transmitting a handover command message from the IP layer of the first base station to a UE device connected to the first base station.

(A7) The method denoted as (A6) may further include, at the first base station, relaying data associated with the UE device between the first central control device and the IP layer of the second base station, during a handover of the UE device from the first base station to the second base station.

(A8) Any one of the methods denoted as (A1) through (A7) may further include operating the first base station in radio frequency (RF) spectrum shared with the second base station.

(A9) The method denoted as (A8) may further include, at the IP layer of the first base station, communicating with the IP layer of the second base station to coordinate use of the RF spectrum between the first base station and the second base station.

(A10) The method denoted as (A9) may further include, at the first base station, coordinating use of the RF spectrum with the second base station at least partially based on respective loads on the first base station and the second base station.

(A11) The method denoted as (A10) may further include, at the IP layer of the first base station, communicating with the IP layer of the second base station to coordinate use of the common RF spectrum between the first base station and the second base station at least partially based on a market price of the RF spectrum.

(B1) A method for communicating between base stations of two different wireless communication networks may include (1) receiving, at an Internet Protocol (IP) layer of a second base station of a second wireless communication network, a setup request message from an IP layer of a first base station of a first wireless communication network, the setup request message including a first user equipment (UE) device context format of the first wireless communication network and a second UE device context format of the second wireless communication network, (2) transmitting, from the IP layer of the second base station to the IP layer of the first base station, a setup response, the setup response including a union of the first UE device context format and the second UE device context format, and (3) at the IP layer of the second base station, communicating with the IP layer of the first base station according to the union of the first UE device context format and the second UE device context format.

(B2) The method denoted as (B1) may further include (1) receiving, at the IP layer of the second base station, a handover request message from the IP layer of the first base station, the handover request complying with the union of the first UE device context format and the second UE device context format, and (2) transmitting a handover confirmation message from the IP layer of the second base station to the IP layer of the first base station.

(B3) Any one of the methods denoted as (B1) and (B2) may further include operating the second base station in radio frequency (RF) spectrum shared with the first base station.

(B4) The method denoted as (B3) may further include, at the IP layer of the second base station, communicating with the IP layer of the first base station to coordinate use of the RF spectrum between the first base station and the second base station.

(B5) The method denoted as (B4) may further include, at the second base station, coordinating use of the RF spectrum with the first base station at least partially based on respective loads on the first base station and the second base station.

(B6) The method denoted as (B4) may further include, at the IP layer of the second base station, communicating with the IP layer of the first base station to coordinate use of the RF spectrum between the first base station and the second base station at least partially based on a market price of the common RF spectrum.

(C1) A method for coordinating a handover of a user equipment (UE) device between respective base stations of two different wireless communication networks may include (1) transmitting a handover request message from an Internet Protocol (IP) layer of a first base station of a first wireless communication network to an IP layer of a second base station of a second wireless communication network, (2) receiving, at the IP layer of the first base station, a handover confirmation message from the IP layer of the second base station, (3) transmitting a handover command message from the IP layer of the first base station to the UE device, and (4) at the first base station, relaying data associated with the UE device between a first central control device of the first wireless network and the IP layer of the second base station, during the handover.

(C2) The method denoted as (C1) may further include (1) determining, at the first base station, that the UE device would be better served by the second base station than the first base station, and (2) transmitting the handover request from the IP layer of the first base station to the IP layer of the second base station in response to determining that the UE device would be better served by the second base station than the first base station.

(C3) In any one of the methods denoted as (C1) and (C2), each of the first wireless communication network and the second wireless communication network may operate according to a fifth generation (5G) New Radio-Unlicensed (NR-U) protocol.

(D1) A method for coordinating a handover of a user equipment (UE) device between respective base stations of two different wireless communication networks may include (1) receiving, at an Internet Protocol (IP) layer of a second base station of a second wireless communication network, a handover request message from an IP protocol layer of a first base station of a first wireless communication network, (2) transmitting a handover confirmation message from the IP layer of the second base station to the IP layer of the first base station, (3) transmitting a path switch request from the IP layer of the second base station to a central control device of the second wireless communication network, the path switch request requesting that the central control device transmit data for the UE device to the second base station, and (4) at the second base station, relaying data associated with the UE device between the IP layer of the first base station and the UE device, during the handover.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for coordinating a handover of a user equipment (UE) device between respective base stations of two different wireless communication networks, comprising:
   transmitting a handover request message from an Internet Protocol (IP) layer of a first base station of a first wireless communication network to an IP layer of a second base station of a second wireless communication network;
   receiving, at the IP layer of the first base station, a handover confirmation message from the IP layer of the second base station;
   transmitting a handover command message from the IP layer of the first base station to the UE device; and
   at the IP layer of the first base station, relaying data associated with the UE device between a first central control device of the first wireless communication network and the IP layer of the second base station, during the handover;
   wherein the handover request message includes:
      an identity of the second base station, and
      an union of a UE device context format of the first wireless communication network and a UE device context format of the second wireless communication network.

2. The method of claim 1, further comprising:
   determining, at the first base station, that the UE device would be better served by the second base station than the first base station; and
   transmitting the handover request message from the IP layer of the first base station to the IP layer of the second base station in response to determining that the UE device would be better served by the second base station than the first base station.

3. The method of claim 1, wherein each of the first wireless communication network and the second wireless communication network operates according to a fifth generation (5G) New Radio-Unlicensed (NR-U) protocol.

4. The method of claim 1, wherein the handover confirmation message includes an acknowledgement of the handover request message.

5. The method of claim 4, wherein the handover confirmation message further includes a command to the first base station to begin the handover.

6. The method of claim 1, wherein the handover command message includes a command to the UE device to disconnect from the first base station and connect to the second base station.

7. A method for coordinating a handover of a user equipment (UE) device between respective base stations of two different wireless communication networks, comprising:
   receiving, at a second base station of a second wireless communication network, a handover request message from a first base station of a first wireless communication network;
   transmitting a handover confirmation message from the second base station to the first base station;
   transmitting a path switch request from the second base station to a central control device of the second wireless communication network, the path switch request requesting that the central control device transmit data for the UE device to the second base station; and
   at the second base station, relaying data associated with the UE device between the first base station and the UE device, during the handover;
   wherein the handover request message includes:
      an identity of the second base station, and
      an union of a UE device context format of the first wireless communication network and a UE device context format of the second wireless communication network.

8. The method of claim 7, wherein each of the first wireless communication network and the second wireless communication network operates according to a fifth generation (5G) New Radio-Unlicensed (NR-U) protocol.

9. The method of claim 7, wherein the handover confirmation message includes an acknowledgement of the handover request message.

10. The method of claim 9, wherein the handover confirmation message further includes a command to the first base station to begin the handover.

11. The method of claim 7, wherein the path switch request includes an identity of the second base station.

12. The method of claim 11, wherein the path switch request further includes an identity of the first base station.

13. The method of claim 11, wherein the path switch request further includes an identity of the UE device.

14. The method of claim 13, wherein the path switch request further includes notification of radio bearers associated with the UE device.

15. The method of claim 7, further comprising receiving, at the second base station, a path switch response message from the central control device.

* * * * *